United States Patent
Yeo

(10) Patent No.: US 7,343,518 B2
(45) Date of Patent: Mar. 11, 2008

(54) METHOD FOR DATA BACKUP OF COMPUTING PLATFORMS THAT ARE OCCASIONALLY CONNECTED

(75) Inventor: Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 629 days.

(21) Appl. No.: 10/875,445

(22) Filed: Jun. 23, 2004

(65) Prior Publication Data

US 2005/0289381 A1    Dec. 29, 2005

(51) Int. Cl.
*G06F 11/00* (2006.01)
(52) U.S. Cl. .......................................... 714/18; 711/162
(58) Field of Classification Search ................. 714/18, 714/748; 711/162
See application file for complete search history.

(56) References Cited

U.S. PATENT DOCUMENTS

| | | | |
|---|---|---|---|
| 6,199,074 B1* | 3/2001 | Kern et al. .................. 707/204 |
| 6,230,319 B1* | 5/2001 | Britt et al. .................. 717/173 |
| 6,308,284 B1* | 10/2001 | LeCrone et al. ................ 714/6 |
| 7,039,663 B1* | 5/2006 | Federwisch et al. ........ 707/205 |
| 7,139,808 B2* | 11/2006 | Anderson et al. ........... 709/212 |
| 7,155,635 B1* | 12/2006 | Phelps ........................... 714/6 |
| 2001/0010070 A1* | 7/2001 | Crockett et al. ............. 711/162 |
| 2005/0286559 A1* | 12/2005 | Miernik et al. .............. 370/468 |

OTHER PUBLICATIONS

Ajitg Ram, "Choosing the most appropriate data storage and data backup services", Thursday, Jul. 22, 1999, ComputerWeekly.com, pp. 1-5.
Dr. Andrew Tridgell, "The Rsync Algorithm", Feb. 25, 2004, http://www.oceanpark.com/webmuseum/rsync.html, pp. 1-28.

\* cited by examiner

*Primary Examiner*—Marc Duncan
(74) *Attorney, Agent, or Firm*—Blakely, Sokoloff, Taylor & Zafman LLP

(57) ABSTRACT

A method for backing up data in a computer system that is occasionally connected to a network is performed by resuming the backup operations even when the backup operations were not successfully completed due to a previous loss to the network connection, according to one embodiment. The backup operations use checksum information to determine changes between a current source file and a version of the backup file. The changes are then used to update the backup file without having to restart the backup operations from the beginning.

19 Claims, 7 Drawing Sheets

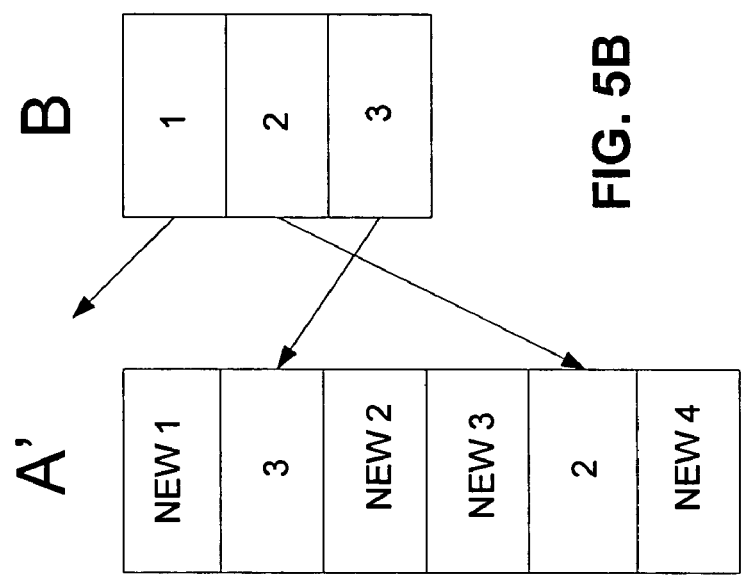

METHOD FOR DATA BACKUP OF COMPUTING PLATFORMS THAT ARE OCCASIONALLY CONNECTED

FIELD OF INVENTION

The present invention generally relates to the field of data processing. More particularly, an embodiment of the present invention relates to backing up information in a computer system over a network when the computer system is occasionally connected to the network.

BACKGROUND

Wired network connection typically exists in traditional business environments to enable computer systems to quickly exchange information with other computer systems such as a server, a host system, and so on. This exchange of information may include, for example, retrieving electronic mail messages, accessing a database in a database server, uploading and downloading data to or from a server, etc. The computer systems may generally be stationary with a wired connection to the network.

Mobile computer systems such as, for example, laptop or notebook computer systems are quickly gaining popularity because of their lightweight, increase in performance and decrease in cost. Like their desktop counterparts, a mobile computer system may be connected to the network using a wired connection. In this situation, a mobile computer system may experience similar network services like a desktop computer system. However, the same may not be said when the mobile computer system uses a wireless connection. This is because the wireless connection may occasionally be dropped or disconnected causing a loss of connection.

BRIEF DESCRIPTION OF THE DRAWINGS

The invention may be best understood by referring to the following description and accompanying drawings that are used to illustrate embodiments of the invention. In the drawings:

FIGS. 3A, 3B, 4A, 4B, 5A and 5B include different examples illustrating various scenario when a file is updated or changed after some or all of its data has been backed up to a backup computer system, in accordance with some embodiments.

DESCRIPTION

Figure 1:
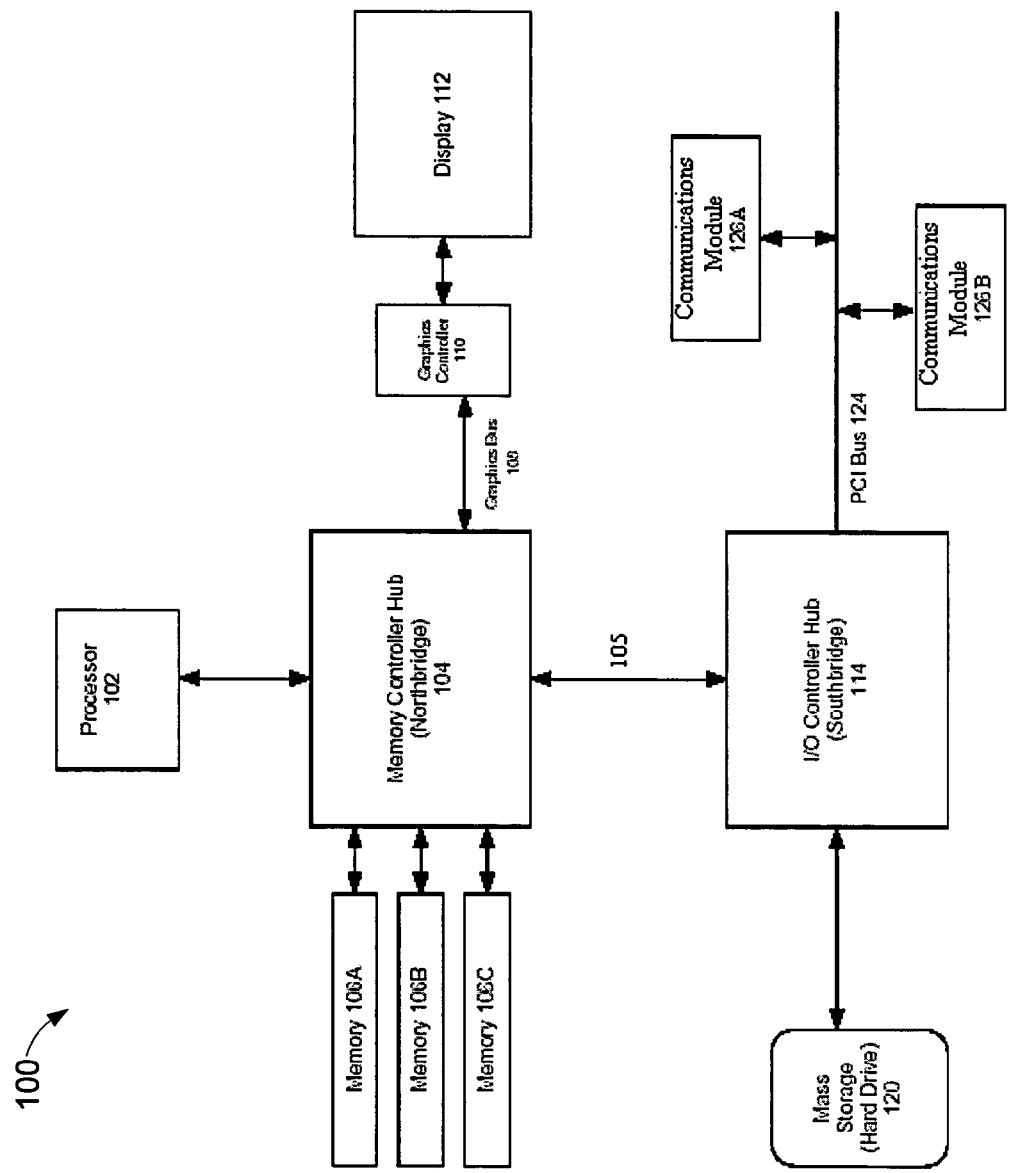
FIG. 1 illustrates one example of a computer system, in accordance with one embodiment.

For one embodiment, a method and system for backing up information in a computer system is disclosed. The computer system may be connected to a network. The network connection may be a wireless connection. Backup operations may be performed by comparing a block of information/data in a source file with a block of information/data in a target file and determining differences between the source file and the target file.

In the following detailed description of embodiments of the present invention numerous specific details are set forth in order to provide a thorough understanding of the present invention. However, it will be apparent to one skilled in the art that embodiments of the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "for one embodiment" in various places in the specification are not necessarily all referring to the same embodiment.

Overview

Backup operation is a process used to prevent loss of information, which may occur because of hardware errors, software errors, or even human actions whether intentional or unintentional. More recently, software viruses have become a common concern of businesses as the viruses may erase valuable critical information. Information loss may be disastrous when the company's business relies on the accuracy and availability of the information. Other negative impacts that may result from the information loss may include, for example, system down time, reduced customer satisfaction, expense to perform information recovery, reduced employee productivity, etc.

Frequent and periodic backup operations may enable certain levels of lost information to be restored when the needs arises. The backup operations may be scheduled to run during non-peak time (e.g., late evening or early morning) and may run over a wired network such as, for example, a local area network (LAN). Information in a desktop or in a mobile computer system may be backed up when the computer system is connected to the network via a network interface. For the backup operations to be successfully completed, the computer system may need to remain connected to the network during the entire time. When an interruption occurs prior to completion, the backup operations usually need to be restarted from the beginning.

Because of its mobility, a mobile computer system may not always be connected to the network via a wired connection. Instead, a wireless connection may be used. It may be more difficult to perform the backup operations with a mobile computer system than with a desktop computer system. For example, as the mobile computer system is transported from one place to another place, the ability to establish a wireless network connection may vary. Furthermore, even when a wireless network connection can be established, the connection speed may vary. In addition, because most backup operations are performed on a scheduled basis, it may be unlikely that at a scheduled time the mobile computer system is connected to the network or even powered on. Consequently, the convenience of mobility may interfere with the needs to backup and to protect the information. At least for these reasons, the responsibility to backup the information of mobile computer systems is often left to the users of the systems. Of course, by relying on the users, the backup operation is almost never done on a regular basis. Thus, while many users of mobile computer systems spend hours generating important information and storing it in the storage devices of the mobile computer systems, the possibility of information loss can be imminent.

In the following discussion, a computer system may be a laptop computer system, a tablet computer system, a personal digital assistant (PDA), or any other computer systems that may experience the type of short-duration or occasional connections described above. In addition, network loss or network connection loss may be caused intentionally or unintentionally. For example, intentional loss may occur when a user of a computer system intentionally disconnects the network connection by moving from one access point to another access point or by closing the lid of the computer system after a brief usage. As another example, unintentional loss may occur when there is a power outage.

Computer System

FIG. 1 illustrates one example of a computer system, in accordance with one embodiment. Computer system 100 may be a mobile computer system and may include processor 102, memory controller hub 104, and I/O controller hub 114. The processor 102 may be a high-performance processor such as, for example, a processor in the family of Pentium processors manufactured by Intel Corporation of Santa Clara, Calif. Other processors may also be used. The memory controller hub 104 may connect to memory system 106(A-C) which may be a combination of one or more static random access memory (SRAM), dynamic random access memory (DRAM), read only memory (ROM), etc. The memory controller hub 104 may be coupled to a graphics controller 110. The display 112 may be connected to the graphics controller 110 and to the memory controller hub 104 via a high-speed graphics bus 108 such as, for example, an Accelerated Graphics Port (AGP) bus. The display 112 may be a liquid crystal display (LCD) or a display that uses other suitable display technology.

The input/output (I/O) controller hub 114 may be connected to the memory controller hub 104 by connection 105. The I/O controller hub 114 may control I/O buses such as, for example, and Peripheral Component Interconnect (PCI) bus 124. The PCI bus 124 may be used to connect one or more communications modules or interface 126 A-B. For example, the communications module 126A may be a wireless wide area network (WWAN) module, a wireless local area network (WLAN) module, etc. The communications module 126B may be a wired network module (e.g., an Ethernet module).

The WLAN module may be used to enable to the computer system 100 to backup its information to a backup server via a wireless connection. The I/O controller hub 114 may also control the operation of mass storage 120 such as, for example, a hard drive. The mass storage 120 may include critical information that needs to be backed up (e.g., to a backup server) to avoid information loss. Although not shown, the computer system 100 may also include other components to enable it to perform various functions.

For some embodiments, the backup operations described herein may refer to operations that backup information in computer systems that are occasionally connected to a network. In addition, although the short-duration or occasional connections examples described herein may refer to connections over a wireless network, it may be possible that the occasional connections may also be include connections established via a wired connection or via a combination of wireless and wired connections. Furthermore, although the examples may refer generally to mobile computer systems, the backup operations described herein may also be applied to non-mobile computer systems.

Blocks Comparison

Figure 2:
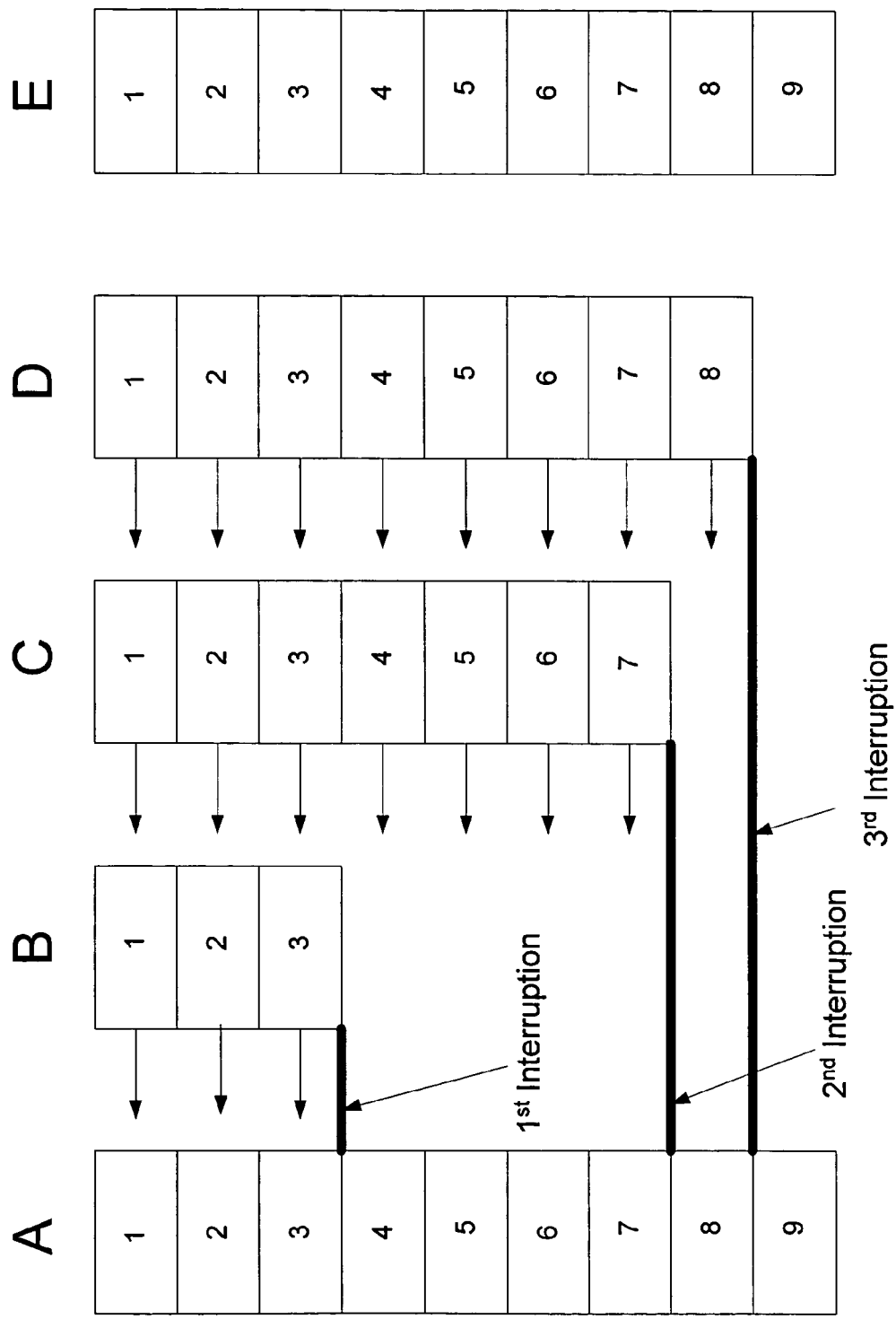
FIG. 2 is a diagram illustrating one example of a backup technique, in accordance with one embodiment.

FIG. 2 is a diagram illustrating one example of the backup operations, in accordance with one embodiment. In this example, a file is used as an information entity that needs to be backed up, although one skilled in the art may recognize that the operations may also be used with other information entities (e.g., a folder, a sub-directory, a partition, a drive, etc). In addition, the file that needs to be backed up may reside locally in the computer system, or it may reside in a network drive that is accessible by the computer system. In the following description, a source file (or source) is used to refer to a file that needs to be backed up. The source file may be associated with a client computer system. A target file (or target) is used to refer to a partial or complete copy of the source file. The target file may be associated with a server computer system.

The example in FIG. 2 refers to a situation when the source file does not change even after previous backup attempts were incomplete due to interruptions or loss in network connections. In this example, the source file is file A. There are different versions of the target file including versions B, C, D and E. Each of the versions of the target file may include different levels of the data in the source file A. For one embodiment, for comparison, the source file A and each of the versions B to E of the target file may be divided into blocks. The blocks may have equal size. For example, the source file A may include 9 blocks. The version B of the target file represents the data from the source file A that has been sent to the backup up server when a first interruption in network connection occurs. In this example, the version B includes the first three (3) blocks (1 to 3) from the source file A.

For one embodiment, when the network connection is re-established, the blocks that have already been sent to the backup server are used to compare with the blocks in the source file to determine which portions of the source file that needs to be sent next. For example, information about each of the blocks 1 to 3 in the version B of the target file may be sent from the backup server to the client. This is illustrated in the example as arrows from the version B of the target file toward the source file A. The client may then examine this information and determines that the information is associated with the first three (3) blocks of the source file A. In this example, the backup operations of the source file A may then continue at the next block (i.e., block 4). It may be noted that the arrows from the version B of the target file toward the source file A are also illustrated in this example as directing toward the respective matching blocks 1 to 3 in the source file A.

The version C of the target file represents the data from the source file A that has been sent to the backup server when a second interruption in network connection occurs. In this example, the version C includes the first seven (7) blocks of data (1 to 7) from the source file A. Information about each of these seven blocks may be sent (illustrated as arrows from C toward A) from the backup server to the client when the connection is re-established to determine where to continue to backup the source file A. Similarly, the version D of the target file represents the data from the source file A that has been sent to the backup server when a third interruption in network connection occurs. In this example, the version D includes the first seven (8) blocks of data (1 to 8) from the source file A. Information about each of these eight blocks are may be sent (illustrated as arrows from C toward A) from the backup server to the client when the connection is re-established. Note that only version E of the target file includes all of the data (blocks 1 to 9) of the source file A.

Checksum

For one embodiment, the information about the blocks of data may be in the form of a checksum. The checksums may be used to determine similarity of two blocks of data in order to perform the backup operations described herein. A checksum may be performed on a block of data that has already been sent to the backup server. This checksum may then be sent to the client from the backup server to identify a block of data in the client that has a similar checksum. When a matching checksum is identified, it may be said that the two blocks of data are similar. For example, let a file X be the file that is in the backup server. The file X is a version of a target file that is a backup (partial or complete) copy of a source file (referred to as Y) in the client.

In this example, the file X is denoted by a sequence of bytes $x_1, x_2, \ldots$. The sequence of bytes in the file X may be divided into multiple blocks. One example is a block of bytes $x_n, x_{n+1}, \ldots, x_k$, where n is the order of the starting byte of the block and k is the order of the ending byte of the block. The block of bytes $x_n, x_{n+1}, \ldots, x_k$ may be non-overlapping. Assume that C(X, n, k) is a checksum computed for the block of bytes from byte n to byte k in the file X. The checksum C(X, n, k) may then be sent from the backup server to the client. The file Y may then be scanned to identify a block of bytes that is (k−n)+1 long and have the same checksum. When such a block is identified in the file Y (e.g., the checksum C(X, n, k) equals the checksum C(Y, n, k)), there is a match. In this situation, it may not be necessary to backup that data block from the file Y in the client to the backup server.

In the example illustrated in FIG. 2, when the latest version of the target file in the backup server is the version B, the backup server may send the checksums of each of the blocks 1 to 3 to the client. The client may then match the received checksums with the checksums of the blocks 1 to 3 from the source file A and then resumes the backup operations by sending the difference between the source file A and the version B of the target file. In this example, the difference includes data blocks 4 to 9.

It may be noted that the backup server may include logic (implemented in software, hardware, or combination of both) to keep track of files from the client that need to be sent to the backup server for backup purposes. This may include keeping track of the latest versions of the files from the client that have already been sent to the backup server. The backup server may also keep track of files that were not successfully sent (e.g., incomplete backup) due to interruptions in network connection. Keeping track of these files may enable the backup server to send the checksums to the client when a network connection is re-established. Furthermore, the backup server may send to the client one checksum at a time, or it may send multiple checksums at a time. Thus, there may be some handshaking activities between the client and the backup server as to whether there is a match and, if there is a match, the location in the client file where the match occurs. Referring to the checksum example above, when the checksum C(X, n, k) matches with the checksum C(Y, n, k), the probability that the block $x_n, \ldots, x_k$ in the X file is identical to the block $y_n, \ldots, y_k$ in the Y file is almost 1. The type of checksums described here is commonly known as one-way hash functions.

Figure 3B:
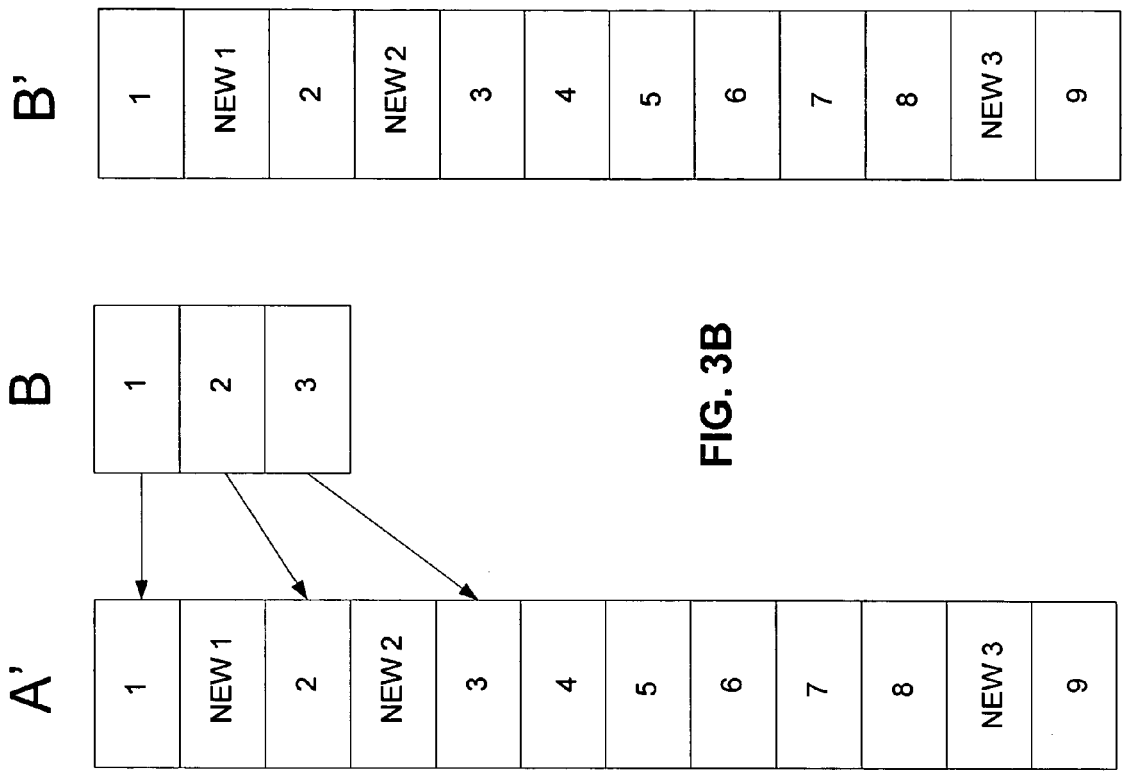
Figure 3A:
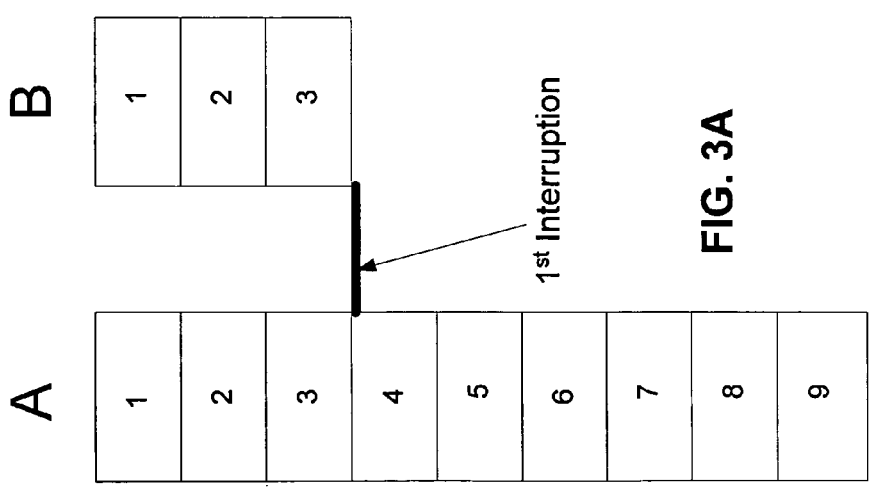

FIGS. 3A, 3B, 4A, 4B, 5A and 5B include different examples to illustrate various scenarios when the source file is updated or changed after some or all of its data has been sent to the backup server, in accordance with some embodiments. Referring to FIG. 3A, when the first network interruption occurs, only the first three data blocks have been sent to the backup server. However, prior to when the network connection is re-established, the source file A is updated and becomes source file A prime or A' having three new data blocks (NEW 1 to NEW 3). When the backup server sends the checksums of the data blocks 1 to 3 of the version B of the target file to the client, the matching checksums are identified in the updated source file A prime. However, the data blocks 2 and 3 in the updated source file A prime are not at the same location (e.g., different offset from the beginning of the source file) as in the original source file A, as illustrated in FIG. 3B. The client may then resume the backup operations by sending the data blocks NEW 1, NEW 2, and those after the data block 3.

For one embodiment, the client may send information to the backup server to indicate where the new data blocks (e.g., data blocks NEW 1 and NEW 2) are to be inserted into the target file to reflect changes that have taken place since the last backup operations. This may only apply when the changes to the source file A occurs in the areas that have already been sent to the backup server. Any update to the source file A in the areas that have not been sent (e.g., block NEW 3) may be viewed by the backup operations as similar to any other data blocks (e.g., data blocks 4 to 9) that have not been sent to the backup server. In this example, version B prime illustrates the target file when the backup operations complete successfully.

Figure 4B:
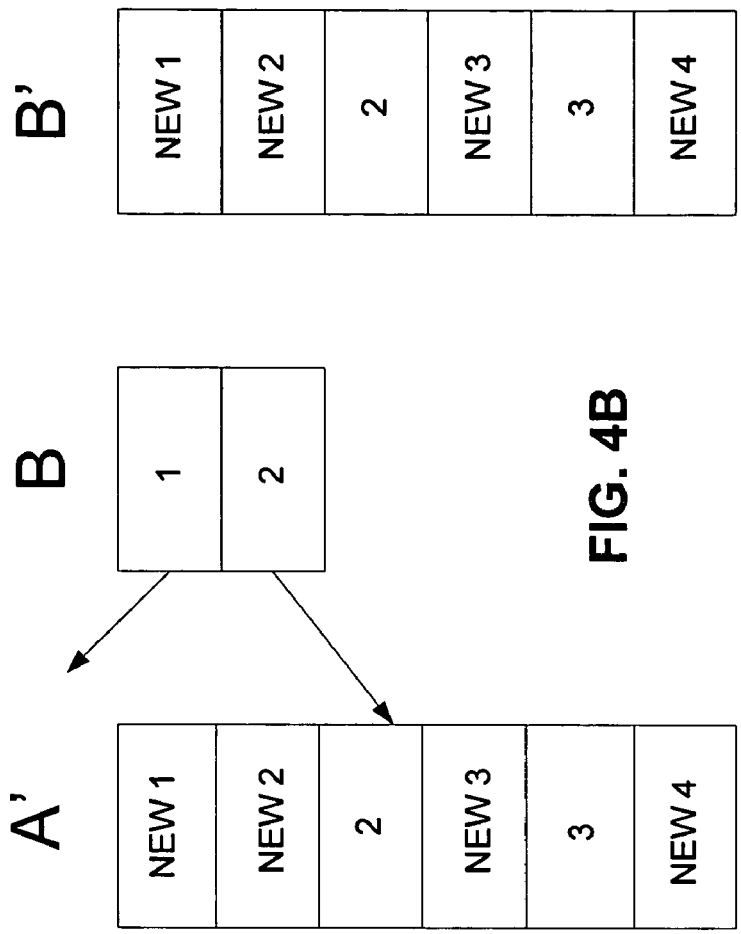
Figure 4A:
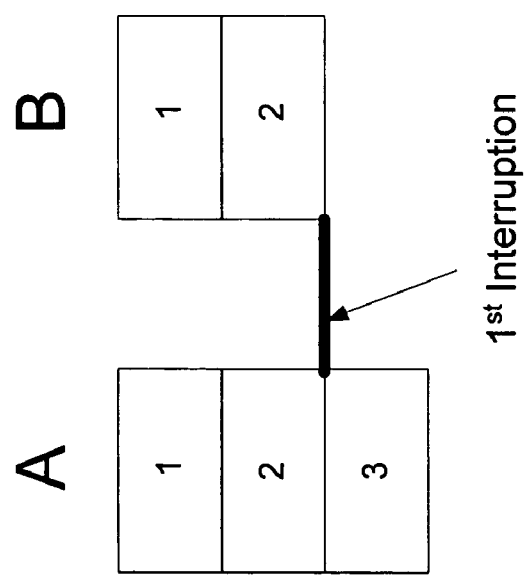

Referring to FIG. 4A, when the first network interruption occurs, only the first two data blocks have been sent to the backup server. However, prior to when the network connection is re-established, the source file A is updated and becomes source file A prime having four new data blocks (NEW 1 to NEW 4). The updated source file A prime also does not include the original data block 1 which may have been deleted. When the backup server sends the checksums of the data blocks 1 and 2 of the version B of the target file to the client, the matching checksum for the data block 2 is identified in the updated source file A prime, although the data block 2 is now at a different location. However, there is no matching checksum for the data block 1, as illustrated in FIG. 4B.

For one embodiment, the client may communicate with the backup server when there is no matching checksum (e.g., checksum for block 1). The backup server may then perform operations to remove the data block having no matching checksum (e.g., data block 1) from its target file. As in the example in FIGS. 3A and 3B, the client may send to the backup server the new data blocks (e.g., data blocks NEW 1 and NEW 2) and information about where to insert them into the target file. In this example, version B prime illustrates the target file when the backup operations complete successfully.

FIGS. 5A and 5B illustrate an example when a source file is updated after it has been successfully backed up to the back up server, in accordance with one embodiment. Referring to FIG. 5A, since there is no interruption during the backup operations, the source file A is the same as the target file B, each having three similar data blocks 1-3. However, before the next backup operations are performed for the source file A, it is updated and becomes source file A prime having four new data blocks (NEW 1 to NEW 4). The updated source file A prime also does not include the original data block 1 which may have been deleted. When the backup server sends the checksums of the data blocks 1 to 3 of the version B of the target file to the client, only the matching checksums for the data blocks 2 and 3 are identified in the updated source file A prime, although both the data blocks 2 and 3 are now at different locations and in different sequence (data block 3 is now before data block 2). There is no matching checksum for the data block 1, as illustrated in FIG. 5B.

For one embodiment, even when there is a matching checksum, the client may communicate to the backup server the location of the corresponding data block within the source file. This may enable the backup server to relocate the data block in the target file if necessary to match with its location in the source file. Similar to the examples in FIGS. 3A and 3B, the client may also send to the backup server the new data blocks (e.g., data blocks NEW 1 to NEW 4) and information about where to insert them into the target file. In this example, version B prime illustrates the target file when the backup operations complete successfully. For one embodiment, the backup operations may be performed using a program commonly referred to as Rsync, which is known to one skilled in the art. It may be noted that embodiments of the invention described herein cover backup operations that take place over a network connection that is occasionally connected.

Although some of the examples above may refer to blocks of data in the source file being modified prior to the network connection is re-established, one skilled in the art may recognize that this data modification may be not be limited to a full block level. For example, the modification to the source may be such that a byte gets inserted and the rest of the source remains the same. Thus, when the size of the block of data is small, the amount of data that may need to be re-sent from the client to the backup server may be reduced. On the other hand, the larger size may reduce the number of checksums that need to be generated and used for comparison between the target and the source.

Client Process

Figure 6:
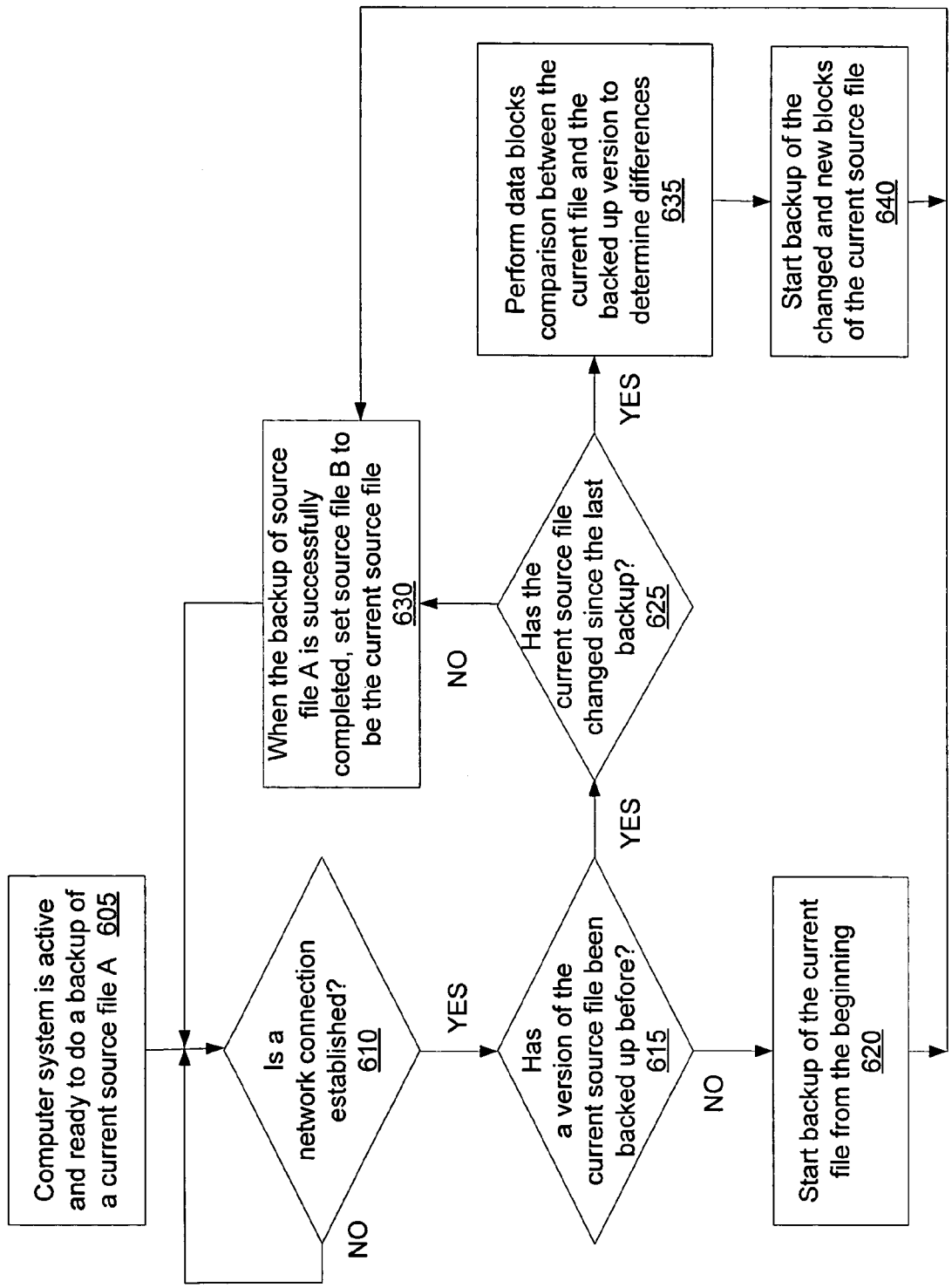
FIG. 6 illustrates one example of a process used by a client computer system to perform the backup operations of its data to a server computer system, in accordance with one embodiment.

FIG. 6 illustrates one example of a process used by a client to perform the backup operations, in accordance with one embodiment. The process described here may be performed by the client to perform the backup operations of one or more source files to a backup server. At block 605, the client is active and ready to perform the backup operations. The backup operations may be performed periodically. The period may be set to a small time window (e.g., every 1 second) in order to capture opportunities at the earliest time when a network connection may be available. At block 610, a test is performed to determine if a network connection is available. When the connection is not available, the process may go back and wait (e.g., enter a sleep mode) until the next window when the test for network connection availability is again performed.

For one embodiment, the client may keep track of the source files that have been sent to the backup server, either partially or completely. From block 610, when the network connection is established, the process flows to block 615. Here a test is performed to determine if a version of a current source file has been sent to the backup server. When there is no previous version (e.g., the source file is new and has not been sent before), the process flows to block 620 where the backup operations are performed from the beginning of the current source file. At block 630, when the backup operations are successfully completed for the current source file, the process continues with a next source file.

From block 615, when the current source file has previously been sent to the backup server, the process flows to block 625 where a test is performed to determine if the current source file has been updated or changed. When it has not been updated, the backup operations are not necessary and may be considered as successfully completed, The process then continue with the next source file, as shown in block 630.

From block 625, when the current source file has been updated since the last backup, the process flows to block 635 where data blocks comparisons are performed to compare the similarity between the data blocks in the source file and the data blocks in the current version of the corresponding target file. Checksums may be used to determine similarity, as described in the examples above. When the differences are determined, the backup operations may resume by sending the differences to the backup server. The process then continues at block 630 to backup the next source file.

Backup Server Process

Figure 7:
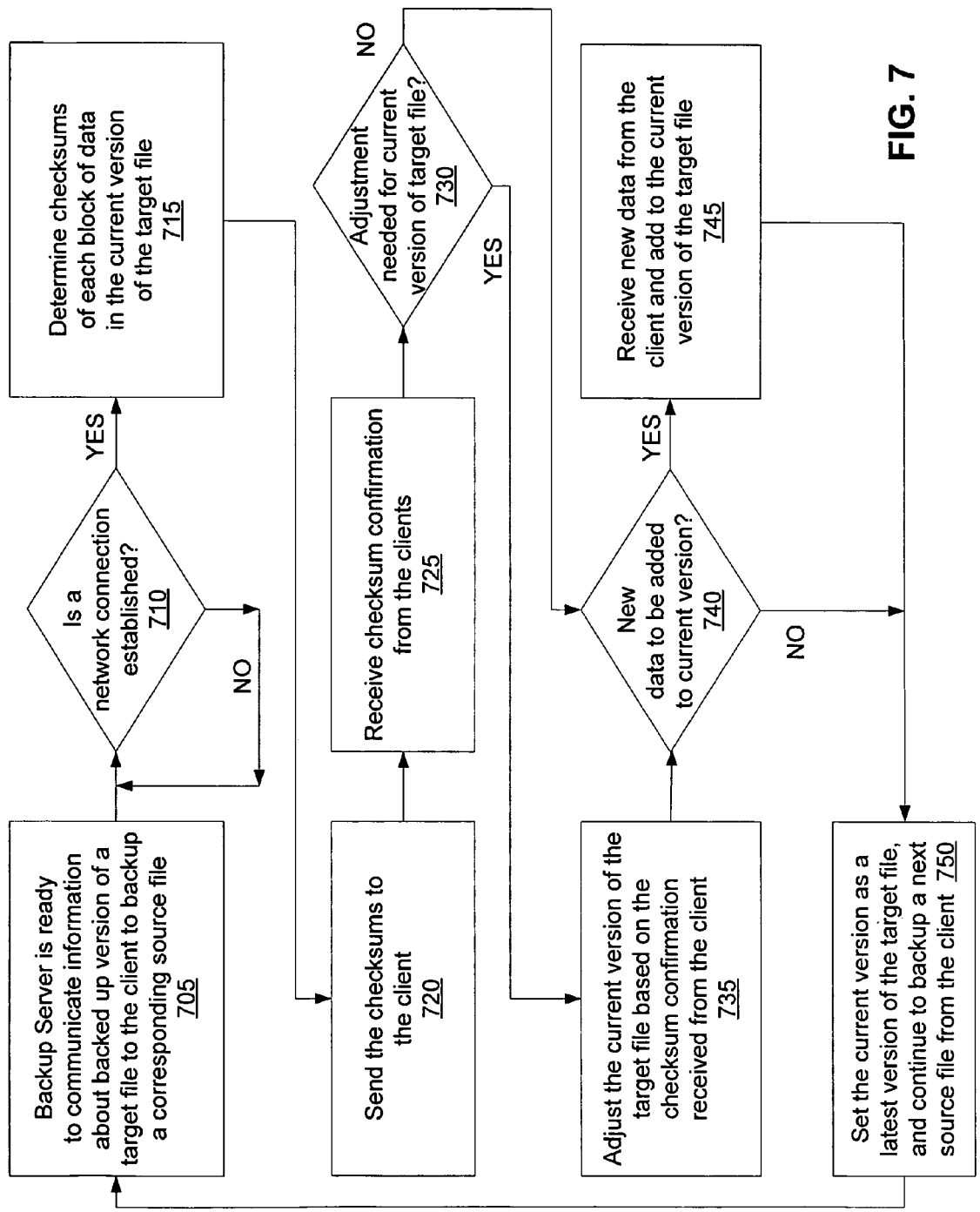
FIG. 7 illustrates one example of a process used by a server computer system to perform backup operations of data in a client computer system, in accordance with one embodiment.

FIG. 7 illustrates one example of a process used by a backup server to perform the backup operations, in accordance with one embodiment. The process described here may be performed by the backup server to communicate information about a current version of a target file to a client so that the backup operations may resume by receiving data blocks from the source file. For one embodiment, the backup server may need to keep track of its clients and the current versions of the target files it has for each of the clients.

At block 705, the backup server is active and ready to perform the backup operations. The backup server may determine if a network connection with the client is established, as shown in block 710, and start sending information about the current version of the target file to the client. Alternatively, the backup server may wait for the client to determine if the network connection is established and to request the backup server to send the information. At block 715, the backup server determines the information to be sent to the client. For example, the information may be in the forms of the checksums, as described above. At block 720, the information is sent to the client. The client may use the information to determine differences between the current source file and the current version of the corresponding target file. The client may then confirm the determination to the backup server, as shown in block 725. The confirmation may include information to indicate that the there is a data block match. The confirmation may also include other information such as, for example, the current location of the matching block within the source file, a new block, a deleted block, etc.

Based on the information received from the client, the backup server determines if the current version of the target file need to be adjusted, as shown in block 730. When the information indicates that there is no adjustment necessary (e.g., the current version of the target file matches the source file from the beginning wholly or partially), the process flows to block 740 where a test is performed to determine if the client is sending additional data blocks to enhance the current version of the target file. For example, the last backup operations of the source file may have been interrupted by a loss in network connection, and more data blocks from the same source file may now need to be sent to the backup server.

From block 730, when one or more adjustments to the current version of the target file are necessary, the process flows to block 735 to adjust the current version. For example, the adjustment may include moving the matching data blocks to different locations within the current version of the target file. The process then flows to block 740 to determine if additional data blocks are to be received from the client. There may not be any additional data blocks if the only change reflected in the current source file includes deleted data blocks.

From block 740, if new data blocks are to be added, the process flows to block 745 where the backup server receives the data blocks from the client. For one embodiment, the new data blocks may be sent by the client in compressed form. The backup server may also receive information about the location of the new data blocks where they are to be added to the current version of the target file. The process then flow to block 750. From block 740, if no new data block is to be added, the process continues at block 750 where the current version of the target file is set to be the latest version. At block 755, the process continues to backup a next source file.

It may be noted that, in the examples described above, the size of the block of data may vary from a single byte to the size of the entire file. When the source file has not been changed since the previous backup operations, a larger data block size may be more efficient and may reduce the number of comparisons. However, when the source file has been updated, the larger data block size may easily cause the checksums to be different, and as a result, may require backing up data that may already be in the target file. When the size of the data block is small, more comparisons may be performed, but the possibility of having matching checksums may increase.

It may be noted that when a network connection is established, the available network bandwidth may be shared concurrently by multiple applications. For example, these applications may include email downloads, backup operations, etc. It may be possible that if the bandwidth used for the backup operations is not controlled, it is very likely that the backup operations will consume all the available bandwidth, which may not be very desirable in a mobile environment. For one embodiment, in order to avoid affecting the operations of the other applications, the bandwidth taken by the backup operations may be controlled or limited to a subset of the available bandwidth.

Computer Readable Media

It is also to be understood that because embodiments of the present invention may be implemented as one or more software programs, embodiments of the present invention may be implemented or realized upon or within a machine readable medium. A machine readable medium may include any mechanism for storing or transmitting information in a form readable by a machine (e.g., a computer). For example, a machine readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
resuming backup operation of a mobile personal computer (MPC) system-after a network connection is re-established, the backup operation previously interrupted by a loss of the network connection due to user movement of the MPC system, wherein resuming the backup operation comprises backing up changes to the MPC system, the changes taking place after the loss of the network connection.

2. The method of claim 1, wherein resuming the backup operation is performed using the network connection and comprises receiving over the network connection a checksum of a data block successfully backed up before the loss of the network connection.

3. The method of claim 2, wherein resuming the backup operation further comprises comparing the checksum received with checksums of data blocks in the MPC system.

4. The method of claim 3, wherein when comparing results in a match, the data block in the MPC system having the matching checksum does not need to be backed up.

5. The method of claim 4, wherein a data block in the MPC system not having a matching checksum is to be included in the resumption of the backup operation.

6. The method of claim 1, wherein the backup operation of the MPC system is limited to a subset of total available bandwidth associated with the established network connection.

7. A method, comprising:
controlling bandwidth available to backup operation of a mobile personal computer (MPC) system over a wireless network connection to enable the network connection to be used concurrently by other applications, wherein the wireless network connection is occasionally connected, wherein when the wireless connection is re-established after a connection interruption due to user movement of the MPG system, the backup operation resumes by backing up changes to the MPC system that occur after the connection interruption.

8. The method of claim 7, wherein checksum is used to determine changes to the data entity after the connection interruption.

9. A machine-readable medium providing instructions, which when executed by a set of one or more processors, causes said set of processors to perform a method, comprising:
resuming backup operation of a MPC system after a network connection is re-established, the backup operation previously interrupted by a loss of the network connection due to user movement of the MPC system, wherein resuming the backup operation comprises backing up changes to the MPC system, the changes taking place after the loss of the network connection, and wherein bandwidth used by the backup operations is controlled to enable sharing total available bandwidth with other applications.

10. The machine-readable medium of claim 9, wherein resuming the backup operation is performed using the network connection and comprises receiving over the network connection a checksum of a data block successfully backed up before the loss of the network connection.

11. The machine-readable medium of claim 10, wherein resuming the backup operation further comprises comparing the checksum received with checksums of data blocks in the MPC system, and wherein when said comparing results in a match, the data block in the MPC system having the matching checksum does not need to be backed up.

12. The machine-readable medium of claim 11, wherein a data block in the MPC system not having a matching checksum is to be included in the resumption of the backup operation.

13. The machine-readable medium of claim 12, wherein the network connection is a wireless connection.

14. A mobile personal computer (MPC) system, comprising:
a processor;

a network interface coupled to the processor and used to establish a network connection; and a storage device coupled to the processor, the storage device is to store a first data entity which is to be backed up using the network connection, wherein when a backup operation of the first data entity is resumed after a loss of network connection due to user movement of the MPC system, the processor is to compare information about a data block successfully backed up prior to the loss of the network connection with data blocks in the first data entity.

15. The system of claim 14, wherein the information about the data block successfully backed up includes a checksum.

16. The system of claim 15, wherein the data block successfully backed up is associated with a second data entity stored in a backup system connected using the network connection.

17. The system of claim 16, wherein the second data entity is an incomplete backup version of the first data entity.

18. The system of claim 14, wherein the network connection is a wireless connection.

19. The system of claim 18, wherein network bandwidth used by the backup operation is controlled to allow total available bandwidth associated with the network connection to be shared by multiple applications.

* * * * *

UNITED STATES PATENT AND TRADEMARK OFFICE
CERTIFICATE OF CORRECTION

PATENT NO. : 7,343,518 B2 Page 1 of 1
APPLICATION NO. : 10/875445
DATED : March 11, 2008
INVENTOR(S) : Yeo It is certified that error appears in the above-identified patent and that said Letters Patent is hereby corrected as shown below:

In column 10, at line 27, delete "MPG" and insert --MPC--.

Signed and Sealed this

Eighteenth Day of November, 2008

JON W. DUDAS
*Director of the United States Patent and Trademark Office*